Jan. 9, 1968 R. F. WILEY 3,362,807
VARIABLE INDEX MECHANISM FOR GLASS PRESS
Filed April 14, 1964 2 Sheets-Sheet 1

INVENTOR.
ROBERT F. WILEY
BY
ATTORNEYS

Jan. 9, 1968   R. F. WILEY.   3,362,807
VARIABLE INDEX MECHANISM FOR GLASS PRESS
Filed April 14, 1964   2 Sheets-Sheet 2

INVENTOR.
ROBERT F. WILEY
BY
*Sughrue, Rothwell, Mion and Zinn*
ATTORNEYS

United States Patent Office 3,362,807
Patented Jan. 9, 1968

3,362,807
VARIABLE INDEX MECHANISM FOR GLASS PRESS
Robert F. Wiley, Corning, N.Y., assignor to Corning Glass Works, Corning, N.Y., a corporation of New York
Filed Apr. 14, 1964, Ser. No. 359,728
3 Claims. (Cl. 65—303)

ABSTRACT OF THE DISCLOSURE

Variable index mechanism for correlating the length of the variable indexing stroke of a rotatable table in a glass press to the number of equally spaced, circumferentially positioned molds actually carried by the table.

---

Automated apparatus for pressing glass have long made use of a rotatable table or turret having a plurality of molds spaced circumferentially about the axis of the turret with indexing means for sequentially indexing the molds to various spaced stations for gob delivery and pressing, product cooling, product discharge and mold cooling. In some cases, the number of molds carried by the table far exceeds the number of separate stations required to effect a completed molding operation. That is, a 16 mold glass press may have a table carrying 16 mold register positions having individual molds fixed thereto while the separate stations required for individual and different functions may only number four. In this case, several stations provide identical functions, such as cooling of the mold or product while, in general, a single station is used for mold injection and pressing and a second single station is used for product removal.

The individual molds fixed to the rotating table are constantly used over and over again in a repetitious cycle to produce a great number of pieces of ware with, of course, some detrimental effect to the mold. Each mold, therefore, has a total life depending upon the number of pieces of ware which may be manufactured from the mold prior to its total destruction or deterioration to the point where it no longer produces ware of the desired quality. Obviously, if the number of pieces of ware to be manufactured is equal to or less than the total life of any one mold, a single mold would be all that is necessary to produce the desired number of pieces regardless of the number of mold register positions for the glass press apparatus. Likewise, for example, if the total life of a mold is 10,000 pieces, then the minimum economical order for a 16 mold press is 160,000 pieces. To obtain the maximum economical use of such glass press apparatus, it would be necessary to provide 16 individual molds and it would be necessary to fill an order in the neighborhood of 160,000 pieces.

It is, therefore, a primary object of this invention to provide an improved glass press apparatus in which the minimum economical order for maximum machine efficiency may be varied without compromising machine output.

It is a further object of this invention to provide an improved glass press apparatus in which the minimum economical output of the machine may be varied by quickly and easily changing from one number of molds to another.

It is a further object of this invention to provide an improved glass press apparatus in which the mold production efficiency is equal to or greater than mold rates of conventional machines.

Further objects of this invention will be pointed out in the following detailed description and claims and illustrated in the accompanying drawings which disclose, by way of example, the principle of this invention and the best mode which has been contemplated of applying that principle.

In general, the improved glass press apparatus of this invention comprises a rotatable table including a plurality of mold positions equally spaced circumferentially thereabout with means for indexing the table sequentially from a first position for gob delivery and pressing to a second position spaced therefrom for product removal. Individual molds are selectively positioned on the table at desired mold registration positions with the table including a plurality of index positions including at least a first index position for gob loading and pressing and a second index position spaced therefrom for product removal. Interchangeable gear means are provided for varying the index stroke depending upon the number of molds positioned on the turret thereby insuring maximum economical output of the glass press.

Figure 1:
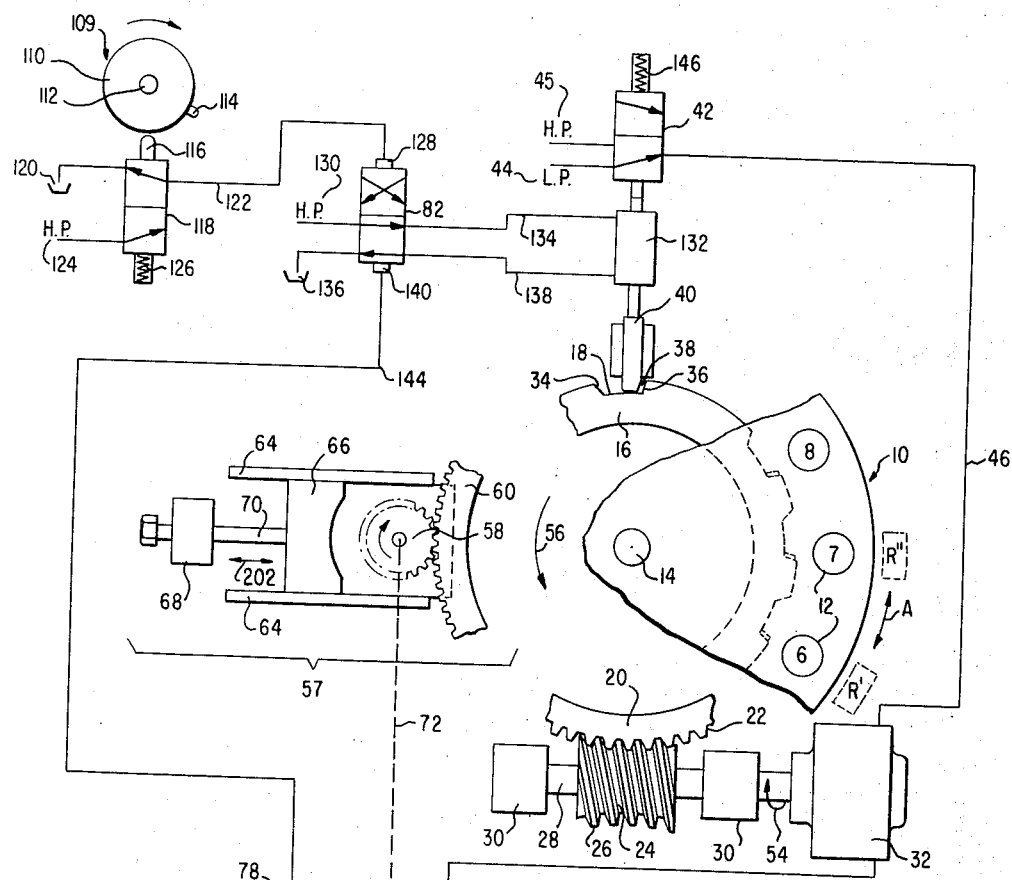
FIGURE 1 is a schematic, top plan view, partially in section, of one embodiment of this invention.
Figure 2:
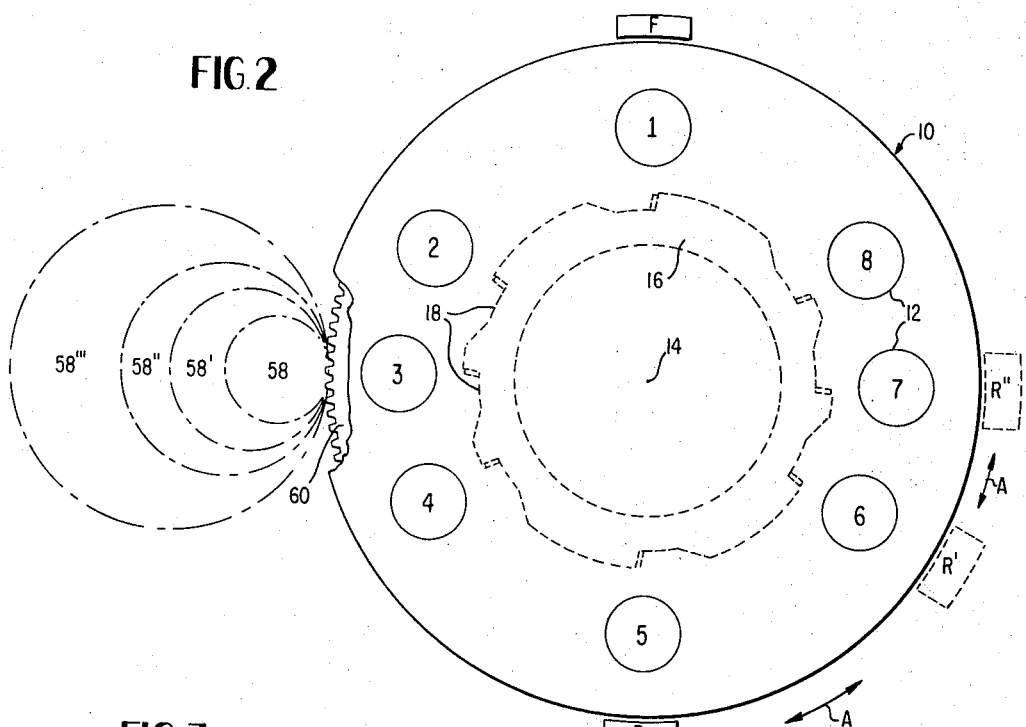
FIGURE 2 is a top plan view of a portion of the apparatus shown in FIGURE 1, partially in section, showing the manner in which the driven gear is interchangeable with respect to the driving gear.

Referring to the drawings, there are shown schematically in FIGURE 1 the necessary elements of the glass press to provide the desired operation with the exception of the gob delivery and pressing means per se as well as the product removal means. These two portions of the glass press apparatus, while important to the overall function of the machine, are well known in the art and any conventional gob delivery and product discharge means may be incorporated with the present apparatus and indeed may be selectively positioned circumferentially about the table at desired index positions. Block F in FIGURE 2 represents a fixed gob feeding and pressing station while block R in solid form at mold position 5 represents the product removal station with dotted line blocks R' and R" indicating alternate product removal station locations depending on the number of molds used. Thus, the product removal means may be adjustably positioned as indicated by arrows A.

The apparatus, therefore, includes as a major element a rotatable table or turret indicated at 10 having, for example, eight index positions or stations which are identified in FIGURE 2 by numerals 1 through 8 appearing within the mold register positions indicated by circles 12, the stations 6 through 8 also being shown on the portion of the turret of FIGURE 1. Fixed to the underside of the rotatable table 10 and rotatable therewith about axis 14 is an annular indexing plate 16 carrying a plurality of spaced indentations or indexing notches 18, the position of the notches on indexing plate 16 corresponding to the mold positions 1 through 8 appearing on rotatable turret 10. A third element in the form of a worm wheel 20 is also fixed to the turret 10 and is rotatable about the same axis 14. The worm wheel 20 includes a toothed periphery at 22 which engages a cone worm 24 including a helical toothed portion 26, the cone worm rotating about a support shaft 28 whose axis lies tangential to the worm wheel 20. In ths respect, the shaft 28 is supported by a pair of bearing members 30 fixed to a common stationary support member with the shaft 28 being driven by a fluid or hydraulic motor 32. Thus, rotation of shaft 28 as a result of operation of fluid motor 32 results in counterclockwise rotation of worm wheel 20 to effect indexing of the mold table 10 about axis 14. The mold table or turret 19 contains 8 mold register holes arranged so that either two, three, four or six molds (not shown) may be placed on the table, all equally spaced circumferentially. For this reason, the mold register hole for mold position 2 is positioned 60 radial degrees from mold position 1 while mold position 3 is 30 degrees from mold position 2 and only 90 degrees from mold position 1. The index plate 16 is provided with the register notches or indentations 18, one at each mold register hole, the notches 18 having a gently sloped leading edge 34 and a rather steep trailing edge 36 with an inserted contact surface 38 formed of relatively hard material, the contact surface 38 acting as the impact receiving element upon the insertion of registration bar 40 to stop further rotation of the table until initiation of the next indexing cycle.

The specific arrangement shown is only illustrative of one of many arrangements for variably indexing the table. For two-mold operation, gob delivery and pressing occurs at station 1 with the table or turret being indexed to station 5 for product cooling and take out. For three-mold operation, gob delivery and pressing would occur at station 1 since gob loading and pressing for all numbers of mold combinations occurs at station 1 with the table then being indexed to station 4 for ware cooling and to station 6 for ware cooling and product removal. For four-mold operation, molding occurs at station 1, the turret 10 is indexed to stations 3 and 5 sequentially for ware cooling and finally indexed to station 7 for product removal. For six-mold operation, molding occurs at station 1, the turret or table is sequentially indexed to stations 2, 4 and 5 for ware cooling, then to station 6 for product removal and finally to station 8 for mold cooling.

It is obvious that for a two-mold operation molding occurs twice during one full rotation of the mold table 10, while in six-mold operation, six mold operations occur and six product removals. Therefore, for each cycle of molding and product removal, machine operation timing must be modified depending upon the number of molds to be used, again depending upon the minimum economical ware order desired.

The elements of the machine are shown as positioned in FIGURE 1 at the dwell position during which time gob delivery and pressing is occurring at station 1 while product removal is occurring at some other spaced but related station. The mold table 10 is held in proper register during this dwell period by low pressure fluid passing through valve 42 from low pressure supply 44 to fluid motor 32 via conduit 46. The low pressure fluid leakage passes from fluid motor 32 through motor output conduit 48 adjustable valve 50 to the sump indicated at 52. The direction of rotation of fluid motor 32 is shown by arrow 54 tending rotate the table or turret 10 counterclockwise as indicated by arrow 56. Thus, during any dwell period, the fluid motor 32 applies a constant but low torque against the register bar 40 locking the table 10 in index position.

The index stroke of the table is varied through the use of a change gear system identified generally at 57.

A driven spur gear 58 meshes with a fourth annular member or spur gear 60 which is likewise fixed to the worm wheel 20 and rotates with worm wheel 20, index plate 16 and table 10 about the common axis 14. The driven spur gear 58 is interchangeable and of varied diameter depending upon the number of molds to be used. As such, the spur gear 58 is positioned upon a sliding support member 62 for longitudinal movement toward and away from the driving gear 60 through the use of a pair of spaced guide members 64. A backing member 66 is coupled to an adjusting device 68 through shaft 70. The adjusting device 68 may be manually or automatically operated to variably position a different size, driven gear 58 in mesh with the driving spur 60 to effect a variable angular velocity output to the mechanical connecting means as indicated by the dotted line 72 for rotating cam members 74 and 76 associated therewith at variable speeds depending upon which size gear is in mesh with the driven spur member 60. It is important to note that regardless of the size of the spur gear 58 mating with drive spur 60, a single rotation of the driven member 58 results in a single cycle of operation of both cam 74 and 76 and the elements which are controlled thereby. Cam 74 controls the valve 78 which either connects high pressure source of fluid 80 to valve 82 or connects the same valve 82 to sump 84. Valve 78, therefore, is a two position valve being cam driven from one position to the other and being normally biased by spring 87 or other biasing means to a position connecting valve 82 to sump 84.

With respect to cam 76, this cam 76 is an eccentric governing the operation of the "position-velocity" valve 88. This valve includes a fluid inlet 90 connected to conduit 48 by line 92 allowing fluid to enter chamber 94 which is bored longitudinally within the valve block 96. A piston 98 is slidably received within the bore and includes a frusto-conical or tapered surface 100 positioned between inlet 90 and outlet 102. In the fully seated position shown, the inlet 90 and outlet 102 are completely blocked off but as the cam or eccentric 76 rotates about its axis, the biasing means in the form of compression spring 104 tends to move the piston 98 from left to right by pressing cam follower 105 against eccentric 76 creating a fluid connection therebetween of varying magnitude depending upon the exposure of the tapered surface 100. Outlet 102 is connected by means of conduit 106 to sump 52 through a second variable restrictive valve. During the dwell period, the cam or eccentric 76 is stopped in a position such that "position-velocity" valve 88 is closed; however, bypassing valve 50 permits a slight flow of fluid from the fluid motor to the sump 52 for two purposes: first, to cause the fluid motor 32 to apply constant torque to the table even though the motor has internal leakage, and second, to start the index cycle when the register bar 40 is physically withdrawn from the cooperating notch 18 of the index plate 16 for sequentially indexing the table 10 from a first index position to a second desired index position which may be the next adjacent index notch 18 or one spaced therefrom. It is apparent that the velocity of the table 10 is controlled by the amount of fluid flowing through motor 32 which in itself is controlled by the position of movable piston 98 and the effective position of tapered surface 100 controlling the connection between fluid inlet 90 and fluid outlet 102 of the variable restriction valve 88.

The machine is provided with a variable speed, continuously rotating timer or some other means which allows synchronization of the gob feeding mechanism with the product removal mechanism. The timer indicated schematically at 109 includes a disc 110, rotating about shaft 112 and carrying a pin 114 projecting from the periphery thereof and operable upon contact with follower 116 to vary the position of the two-position valve 118. The two-position valve 118 is normally coupled to sump 120 but upon contact between members 114 and 116, the connection is broken and a connection between line 122 and the source of high pressure fluid 124 is created against the bias of compression spring 126 to deliver high pressure fluid to the operating face 128 of valve 82. This reverses the fluid connections between the source 130 of high pressure fluid and cylinder 132 through conduit 134 and the sump 136 through conduit 138. Thus, the table or turret index is started by trip button 114 contacting follower 116 which opens the three-way valve 118 momentarily, producing a fluid force as a result of high pressure connection from supply 124 to the inlet 128 of valve 82. The spool shifts therein, causing fluid cylinder 132 to shift or retract the register bar 40 and simultaneously mechanically shift the spool of three-way valve 42. Shifting of three-way valve 42 results in changing the connection between fluid motor 32 and the low pressure source 44 to one of high fluid pressure from source 45 through the same conduit 46 allowing the high pressure fluid to surge through the indexing motor 32 during the index stroke. Of course, the very initial index movement is caused merely by a slight fluid flow even as a result of the high pressure connection through the fluid motor since bypass valve 50 provides a high restriction. This slight index movement tends to rotate the change gear 58 and thus the cams 74 and 76 mechanically fixed thereto, to slightly open the "position-velocity" valve 88 and more specifically the piston 98. The table index acceleration is now under control of the cam or eccentric 76 and the valve 88.

As mentioned previously, change gear 58 is selected to provide the proper index stroke for a given number of molds. Thus, the change gear 58 and cams 74 and 76 always make one complete revolution per table index. The first one-half revolution of gear 58 and cam 76 controls the table acceleration, while the last half of the revolution controls table deceleration, FIGURE 4. Just prior to completing an index stroke, cam 74 opens momentarily valve 78 to connect the high pressure source of fluid 80 to the operating face 140 of four-way valve 82 through fluid conduit 144, shifting the valve therein and causing the reversal in connections between the high pressure fluid source 130, the sump 136 and cylinder 132 which moves the register bar 40 into position just prior to index completion. Of course, simultaneously, movement of cylinder 132 results in permitting the biasing spring 146 of valve 42 to shift the spool within this valve causing the low pressure fluid from source 44 to enter fluid motor 32 and complete the index cycle. It may be noted, that the "position-velocity" valve 88 includes as a part of its circuitry, the adjustable valve 108 which may be adjusted to reduce the table velocity below the maximum if necessary. In this respect, valve 108 acts in conjunction with tapered surface 100 for permitting a still further restriction of the fluid flow through valve 108, thus causing a slower indexing stroke.

Figure 5:
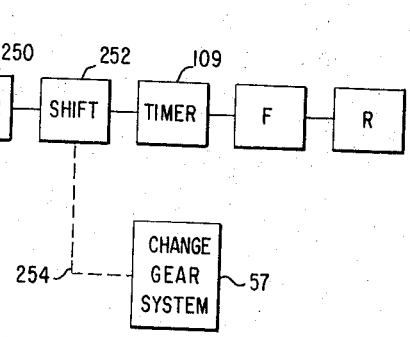
FIGURE 5 is a block diagram of the elements forming the adjustable control system incorporated within the apparatus of the present invention.
Figure 3:
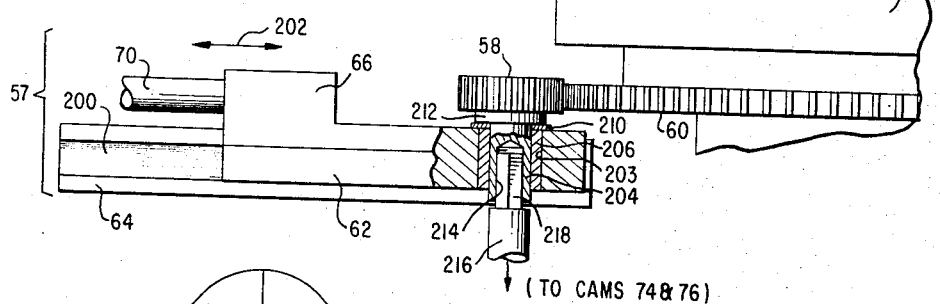
FIGURE 3 is a side elevational view, partially in section, of a portion of the apparatus shown in FIGURES 1 and 2 showing in detail, the interchangeable connection between the driving and driven gears.

The variable index arrangement is advantageously achieved through the use of change gear 58 which acts as the driven gear, the change gear being coupled to spur gear 60 carried by the rotating turret or table 10. The mechanical arrangement of these elements and the method of interchangeability of the spur gear 58 may be better seen by reference to FIGURES 2 and 3. Spur gear 60 remains fixed to rotating table 10 and is not interchangeable. However, gear 58 may be interchanged with larger change gears which would cover the areas 58', 58'', and 58''', indicated by the dotted lines in FIGURE 2. In order to provide for interchangeability between these gears, and as set forth previously, a pair of fixed guide members 64 are provided, the guide members having grooves 200, FIGURE 3, along the inner wall which act to receive the cooperating ends of gear support member 62 and the backing member 66. The backing member is connected to the adjusting means through rod 70 allowing either a mechanical or manual reciprocation as indicated by arrow 202 in FIGURE 3. In this manner, not only is the physical size of the driven spur gear 58 changed, but the axial position of the change gear 58 is also varied with respect to the fixed axis 14 of the rotating table and associated members. Likewise, the position of the mechanical means linking the driven spur gear 58 and the operating cams 74 and 76 is also varied. With reference to FIGURE 3, it is noted that the small pinion gear 58 is fixedly attached to a supporting shaft 204 positioned within an annular bearing or bushing 206 which is received within an aperture 203 formed within the slidable block 62. It is apparent, therefore, that the spur gear 58 is positioned for free rotation about its axis within block 62. Bushing member 206 has an annular rim 210 forming a thrust-bearing surface and acting against flange 212 fixed to one side of pinion 58 adjacent shaft 204. The shaft 204 is provided with an opening 214 which is rectangular in cross section of mechanically receiving a connecting means, shown as a rod 216, having a projecting portion 218 of rectangular cross section. The rod 216 forms a direct mechanical connection to cams 74 and 76, and in this sense, is the direct mechanical connection identified by the dotted line 72 in FIGURE 1. Thus, rotation of spur gear 58 or its equivalent 58', 58'' or 58''' provides the desired indexing sequence and acts simultaneously to mechanically rotate cams 74 and 76 fixed to shaft 216. If a spur gear identified by the dotted line area 58'' is to replace the spur gear indicated at 58 in FIGURE 3, all that is necessary is for rod 70 to be moved from right to left separating spur gear 58 from driving member 60, the spur gear 58 and its integral shaft 204 is thus freely removed from bushing 206, a new spur gear 58'' of desired diameter is replaced, a connection made between shaft 216 and the new spur gear 58'', the slide 62 moved from left to right to again engage the driving and driven surfaces of the mating gears 58'' and driving gear 60. The apparatus is ready for operation after suitable necessary changes are made to the rotating mold table 10, the placement of the take out or product removal mechanism and proper resetting of the timer buttons for the desired machine cycle. FIGURE 5 shows in block form one system allowing changeable machine operation. A motor 250 is connected through gear shift 252 directly to timer 109 and indirectly as indicated by dotted line 254 to change gear system 57. In addition, timer 109 is connected to both gob feeding and pressing means F and product removal means R for activating these components of the system during index dwell. It may be advantageous to place covers on the unused mold register holes should less than eight molds be used. For instance, if molds occupy mold register positions 1 and 5, covers may be placed over mold register positions 2, 3, 4, 6, 7 and 8.

Reference to the following table may be had which indicates typical mold press operations for achieving a set number of ware pieces per minute assuming the same average table velocity during index. The table indicates a comparison between a standard 16 mold table of the non-variable index type, giving press cycle times, table index times and table dwell times as compared to the exemplary apparatus of the present invention for either 2, 3, 4 or 6-mold operation.

|  | Press Cycle Time, sec. | Table Index Time, sec. | Table Dwell Time, sec. |
| --- | --- | --- | --- |
| 16-Mold | 2.5 | .5 | 2 |
| 6-Mold | 6.66 | 1.33 | 5.33 |
| 4-Mold | 10 | 2 | 8 |
| 3-Mold | 13.33 | 2.7 | 10.63 |
| 2-Mold | 20 | 4 | 16 |

Figure 4:
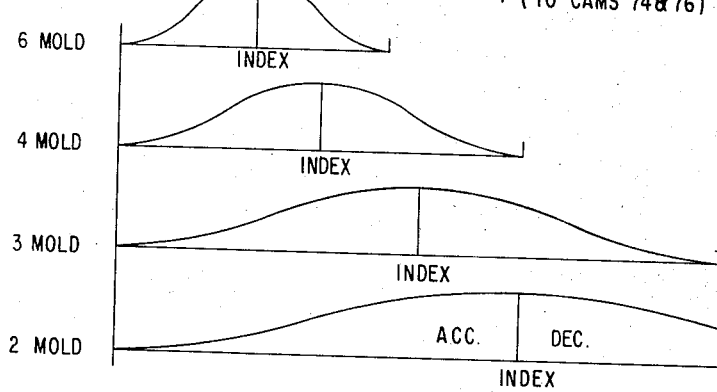
FIGURE 4 is a graph of the table position velocity curves during indexing for two-mold, three-mold, four-mold and six-mold operation.

In order to visually show the effect of varying the index stroke for different numbers of molds desired and to show the comparison between table index times in which the same maximum table velocity occurs during index, reference may be had to FIGURE 4. FIGURE 4 shows a table "position-velocity" diagram during index from start of index position to the end of indexing for two-mold, three-mold, four-mold and six-mold operation. It is apparent, for instance, that the time and index stroke distance from start to finish of an index operation for a four-mold usage is approximately one-half of that for two molds, while the curves are similarly shaped, the maximum velocity at the midpoint of the index remains substantially constant.

Correlation between the diagrams of FIGURE 4 and the diagrammatic positioning of the spur gears 58, 58', 58″ and 58‴ of FIGURE 2 may be had. It is apparent, for instance, that the relatively large gear 58‴ will provide the curve shown in the lower portion of FIGURE 4 for two-mold operation in which a single rotation of the relatively large driven gear 58‴ will result in a full 180° indexing of a mold from a position such as number 1 for gob loading and pressing to position 5 for product removal. Similarly, by using driven gear 58, the mold position at station 1 for gob loading and pressing will have sequentially moved only to position 2, approximately one-third the distance it was moved for two-mold operation as indicated by the base line of the curve in the upper portion of FIGURE 4 for six-mold operation.

While there have been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. In a molding apparatus for molding successive glass preforms in a plurality of successive molds including a rotatable table for supporting said molds and a fluid motor for indexing said table, the improvement comprising: detent means for normally maintaining said table at an index position, means for initially supplying low pressure fluid to said motor for driving said table toward the next index position at low speed, timing means for withdrawing said detent and initiating the flow of high pressure fluid to said motor, a normally open throttle valve connected between said fluid motor and a fluid sump, and eccentric means positively driven by said rotating table for maintaining said throttle valve closed at the time of detent release, but allowing said throttle valve to open to an increasingly greater extent just after high pressure fluid flow initiation and close to an increasingly greater extent just before high pressure fluid flow termination.

2. In a molding apparatus for molding successive glass preforms in a plurality of successive molds including a movable support for said molds, a fluid motor for indexing said mold support, and means for initiating and terminating high pressure fluid flow to said motor, the improvement comprising: a throttling valve, fluid flow means connecting said throttling valve to said motor, movable means carried by said valve for varying the flow rate of fluid passing therethrough, first means operatively coupled to said support, and said throttling valve and responsive to initial movement of said support from one index position for continuously increasing the rate of fluid flow through said valve for controlled acceleration of said support, and second means operatively coupled to said support and responsive to support approach to a succeeding index position for continuously decreasing the rate of fluid flow through said valve for controlled deceleration of said support just before index stroke termination.

3. In a molding apparatus for molding successive glass preforms in a plurality of successive molds including a movable support for said molds, a fluid motor for indexing said mold support, and means for initiating and terminating high pressure fluid flow to said motor, the improvement comprising: the rotary cam driven by said mold support, a throttling valve fluid coupled in series with said motor and having an orifice of fixed size, a cam follower including a tapered piston, operatively coupled to said cam with the tapered end of said piston positioned within said orifice and responsive to eccentric rotation of said cam to vary the size of the opening formed between said orifice and said tapered piston, the configuration of said eccentric being such that said opening increases in size during initiation of fluid flow to said motor and decreases in size during termination thereof.

References Cited

UNITED STATES PATENTS

| | | | |
|---|---|---|---|
| 1,515,962 | 11/1924 | Miller | 65—241 |
| 2,186,179 | 1/1940 | Sloan | 65—308 X |

DONALL H. SYLVESTER, *Primary Examiner.*

A. D. KELLOGG, *Assistant Examiner.*